(12) United States Patent
Zhou

(10) Patent No.: US 11,012,198 B2
(45) Date of Patent: May 18, 2021

(54) HARQ FEEDBACK METHOD, APPARATUS AND SYSTEM

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/554,289

(22) Filed: Aug. 28, 2019

(65) Prior Publication Data

US 2019/0386785 A1 Dec. 19, 2019

Related U.S. Application Data

(63) Continuation of application No. PCT/CN2017/078445, filed on Mar. 28, 2017.

(51) Int. Cl.
| | | |
|---|---|---|
| *H04L 1/18* | (2006.01) | |
| *H04W 4/70* | (2018.01) | |
| *H04W 76/27* | (2018.01) | |
| *H04W 72/04* | (2009.01) | |

(52) U.S. Cl.
CPC ............. *H04L 1/1819* (2013.01); *H04W 4/70* (2018.02); *H04W 72/0446* (2013.01); *H04W 76/27* (2018.02)

(58) Field of Classification Search
CPC ... H04L 1/1819; H04L 1/1854; H04L 1/1861; H04L 1/1607; H04L 1/1812; H04L 1/1864; H04W 4/70; H04W 76/27; H04W 72/0446

See application file for complete search history.

(56) References Cited

U.S. PATENT DOCUMENTS

| | | |
|---|---|---|
| 9,578,640 B1 | 2/2017 | Singh et al. |
| 2016/0353454 A1 | 12/2016 | Bai et al. |
| 2018/0279291 A1* | 9/2018 | Tiirola ............... H04B 1/713 |

FOREIGN PATENT DOCUMENTS

| | | |
|---|---|---|
| CN | 102124684 A | 7/2011 |
| CN | 103095433 A | 5/2013 |
| CN | 103973397 A | 8/2014 |
| CN | 105577331 A | 5/2016 |

OTHER PUBLICATIONS

First office action of Chinese application No. 201780000168.4 dated Aug. 1, 2019.

(Continued)

*Primary Examiner* — Afshawn M Towfighi
(74) *Attorney, Agent, or Firm* — Syncoda LLC; Feng Ma

(57) ABSTRACT

A hybrid automatic repeat request (HARQ) feedback method includes: receiving, by a first equipment, a data subframe transmitted by a second equipment, wherein the data subframe comprises a first slot corresponding to a first type of service and a second slot corresponding to a second type of service; generating, by the first equipment, the HARQ feedback according to the data subframe, wherein the HARQ feedback includes a first feedback bit corresponding to the first slot and a second feedback bit corresponding to the second slot; and transmitting, by the first equipment, the HARQ feedback to the second equipment.

20 Claims, 11 Drawing Sheets

(56) References Cited

OTHER PUBLICATIONS

International search report of PCT application No. PCT/CN2017/078445 dated Oct. 30, 2017.
Extended European search report of counterpart EP application No. 17902766.9 dated Nov. 3, 2020.
QUALCOMM Incorporated, Multi-bit HARQ-ACK feedback, 3GPP Draft; R1-1702636 Multi-Bit HARQ-ACK Feedback, 3rd Generation Partnership Project (3GPP), Mobile Competence Centre; vol. RAN WG1, No. Athens, Greece; Feb. 13, 2017-Feb. 17, 2017, Feb. 7, 2017; pp. 1-3, 5-7, figure 2.
Xiaom, Consideration on NR HARQ design, 3GPP Draft; R1-1703146, 3rd Generation Partnership Project (3GPP), Mobile Competence Centre; vol. RAN WG1, Feb. 13, 2017-Feb. 17, 2017, Feb. 12, 2017, entire document.
Samsung; CB-group based retransmission for eMBB, 3GPP Draft; R1-1702990—CBG-Based Retransmission for EMBB, 3rd Generation Partnership Project (3GPP), Mobile Competence Centre; vol. RAN WG1, Feb. 13, 2017-Feb. 17, 2017, Feb. 12, 2017, p. 6, last paragraph, p. 7, first paragraph, figure 1.
Samsung, Partial retransmission for eMBB, 3GPP Draft; R1-1612535-Partial Retransmission for EMBB, 3rd Generation Partnership Project (3GPP), Mobile Competence Centre; vol. RAN WG1, Nov. 14, 2016-Nov. 18, 2016, Nov. 4, 2016 (Nov. 4, 2016), p. 1, last two paragraphs, p. 2, figure 1.

\* cited by examiner

HARQ FEEDBACK METHOD, APPARATUS AND SYSTEM

CROSS-REFERENCE TO RELATED APPLICATIONS

This application is a continuation of International Application No. PCT/CN2017/078445, filed on Mar. 28, 2017, the disclosure of which is incorporated herein by reference in its entirety.

BACKGROUND

In a long-term evolution (LTE) system, in order to reduce symbol error rate of data transmission and thus improve the transmission quality, a hybrid automatic repeat request (HARQ) mechanism is adopted by the LTE system.

In related arts, after receiving downlink data transmitted by a base station, a terminal detects whether the downlink data is received correctly, and then performs ACK/NACK feedback according to the detection result. Wherein, the terminal performs the ACK/NACK feedback in subframes, that is, all slots of one subframe correspond to a 1 bit of the ACK/NACK feedback information. When the received ACK/NACK feedback information indicates that the subframe is not received correctly, the base station re-transmits the subframe to the terminal until the subframe is received correctly.

SUMMARY

The present disclosure is related to the field of communications, and more specifically to a hybrid automatic repeat request (HARQ) feedback method, apparatus and system.

In order to solve the problem that a HARQ mechanism in an LTE system cannot be used with the 5G system, various embodiments of the present disclosure provide a HARQ feedback method, apparatus and system.

In a first aspect, there is provided a hybrid automatic repeat request (HARQ) feedback method, including:

receiving, by a first equipment, a data subframe transmitted by a second equipment, wherein the data subframe includes a first slot corresponding to a first type of service and a second slot corresponding to a second type of service;

generating, by the first equipment, the HARQ feedback according to the data subframe, wherein the HARQ feedback includes a first feedback bit corresponding to the first slot and a second feedback bit corresponding to the second slot; and transmitting, by the first equipment, the HARQ feedback to the second equipment.

In some embodiments, the method further includes:

acquiring, by the first equipment, feedback policy information for the generating the HARQ feedback.

In some embodiments, the latency of the first type of service is lower than that of the second type of service.

In some embodiments, the feedback policy information includes the number of feedback bits for the HARQ feedback; the number of the first slots of the data subframe is a first number n, the number of the feedback bits is m, and m is greater than or equal to 2;

the generating the HARQ feedback according to the data subframe includes:

detecting, by the first equipment, whether the first number is less than the number of feedback bits;

allocating, by the first equipment, the n first feedback bits to the n first slots when the first number is less than the number of feedback bits, wherein the n first feedback bits are configured to acknowledge the data received by the n first slots respectively; allocating, by the first equipment, m−n second feedback bits to the second slot, wherein the m−n second feedback bits are configured to acknowledge the data received by the second slots; and when the first number is greater than or equal to the number of feedback bits, allocating, by the first equipment, the m−1 first feedback bits to the n first slots, wherein the m−1 first feedback bits are configured to acknowledge the data received by the n first slots; allocating, by the first equipment, one of the second feedback bits to the second slot, wherein the second feedback bit is configured to acknowledge the data received by the second slot.

In some embodiments, the feedback policy information further includes a binding policy for slots corresponding to the same type of service;

the allocating the m−1 first feedback bits to the n first slots includes:

allocating, by the first equipment, the m−2 first feedback bits to the first m−2 first slots according to the binding policy and a time-domain sequence of the first slots; and binding the residual n−m+2 first slots, and allocating, by the first equipment, one first feedback bit to it.

In some embodiments, the feedback policy information includes the number of feedback bits of the HARQ feedback, wherein the number of the first slots of the data subframe is a first number n, and the number of the feedback bits is 1 bit;

the generating, by the first equipment, the HARQ feedback according to the data subframe includes:

allocating, by the first equipment, the first feedback bit to the n first slots, wherein the first feedback bit is configured to acknowledge the data received by the n first slots; and when the first slot is not included in a next data subframe, allocating, by the first equipment, a second feedback bit to a second slot in the current data subframe and a second slot in the next data subframe.

In some embodiments, the first feedback bit is an additional bit in the HARQ feedback, and the feedback policy information includes the number of the additional bits, and the number of the first slots of the data subframe is a first number n, and the number of additional bits is k;

wherein the generating the HARQ feedback according to the data subframe includes:

detecting, by the first equipment, whether the first number is greater than the number of additional bits;

when the first number is less than or equal to the number of additional bits, allocating, by the first equipment, n additional bits of the k additional bits to the n first slots, wherein the n additional bits are configured to acknowledge the data received by the n first slots respectively; and when the first number is greater than the number of additional bits, allocating, by the first equipment, the k additional bits to the n first slots, wherein the k additional bits are configured to acknowledge the data received by the n first slots.

In some embodiments, the feedback policy information further includes a binding policy for slots corresponding to the same type of service;

wherein the allocating the k additional bits to the n first slots includes:

allocating, by the first equipment, the k−1 additional bits to the first k−1 first slots according to the binding policy and a time-domain sequence of the first slots, wherein the k−1 additional bits are configured to acknowledge the data received by the first k−1 first slots respectively; and binding the residual n−k+1 first slots, and allocating, by the first equipment, one additional bit to it, wherein the additional bit is configured to acknowledge the data received by the residual n−k+1 first slots.

In some embodiments, the first type of service is an ultra-reliable low latency communication (URLLC) service; and the second type of service is an enhanced mobile broadband (eMBB) service and/or a mass machine communication (mMTC) service.

In some embodiments, the feedback policy information is transmitted via a physical broadcast channel (PBCH), a radio resource control protocol (RRC) signaling or a physical downlink control channel (PDCCH).

In a second aspect, there is provided a hybrid automatic repeat request (HARQ) feedback method, including:

transmitting, by a second equipment, a data subframe to a first equipment, wherein the data subframe includes a first slot corresponding to a first type of service and a second slot corresponding to a second type of service;

receiving, by the second equipment, the HARQ feedback transmitted by the first equipment, wherein the HARQ feedback includes a first feedback bit corresponding to the first slot and a second feedback bit corresponding to the second slot; and performing, by the second equipment, retransmission according to the HARQ feedback.

In some embodiments, the method further includes:

acquiring, by the second equipment, feedback policy information for instructing rules for generating the HARQ feedback;

wherein the performing retransmission according to the HARQ feedback includes:

analyzing, by the second equipment, the HARQ feedback according to the feedback policy information; and performing retransmission according to the analysis result.

In some embodiments, the feedback policy information includes:

the number of feedback bits for the HARQ feedback; and/or, a binding policy for slots corresponding to the same type of service.

In some embodiments, the feedback policy information includes:

the number of additional bits, which is configured to indicate the number of additional bits in the HARQ feedback, wherein the additional bits are the first feedback bits. and/or, a binding policy for slots corresponding to the same type of service.

In some embodiments, the latency of the first type of service is lower than that of the second type of service;

wherein the performing retransmission according to the analysis result includes:

when the analysis result indicates that the data in the first slot is not received correctly and the data in the second slot is not received correctly, retransmitting, by the second equipment, the data in the first slot, and then retransmitting the data in the second slot.

In some embodiments, wherein the first type of service is an ultra-reliable low-latency communication (URLLC) service; and the second type of service is an enhanced mobile broadband (eMBB) service and/or a mass machine communication (mMTC) service.

In a third aspect, there is provided a hybrid automatic repeat request (HARQ) feedback apparatus, including:

a first receiving module, which is configured to receive a data subframe transmitted by a second equipment, wherein the data subframe includes a first slot of a first type of service and a second slot of a second type of service;

a generating module, which is configured to generate the HARQ feedback according to the data subframe, wherein the HARQ feedback includes a first feedback bit corresponding to the first slot and a second feedback bit corresponding to the second slot; and a first transmitting module, which is configured to transmit the HARQ feedback to the second equipment.

In some embodiments, the apparatus further includes:

a first acquiring module, which is configured to acquire feedback policy information, wherein the feedback policy information is used to indicate a generation rule of the HARQ feedback.

In some embodiments, the latency of the first type of service is lower than that of the second type of service.

In some embodiments, the feedback policy information includes the number of feedback bits for the HARQ feedback, and the number of the first slots in the data subframe is a first number n, the number of the feedback bits is m, and m is greater than or equal to 2;

the generating module includes:

a first detecting module, which is configured to detect whether the first number is less than the number of the feedback bits;

a first allocating sub-module, which is configured to: when the first number is less than the number of the feedback bits, allocate n ones of the first feedback bits to n ones of the first slots, wherein the n ones of the first feedback bits are used to confirm data received by the n ones of the first slots respectively; and allocate m−n ones of the second feedback bits to the second slot, wherein the m−n ones of the second feedback bits are used to confirm data received by the second slot; and a second allocating sub-module, which is configured to: when the first number is greater than or equal to the number of feedback bits, allocating, by the first equipment, the m−1 first feedback bits to the n first slots, wherein the m−1 first feedback bits are configured to acknowledge the data received by the n first slots; allocating, by the first equipment, one of the second feedback bits to the second slot, wherein the second feedback bit is configured to acknowledge the data received by the second slot.

In some embodiments, the feedback policy information further includes a binding policy for slots corresponding to the same type of service;

wherein the second allocating sub-module is further configured to:

allocate the m−2 first feedback bits to the first m−2 first slots according to the binding policy and a time-domain sequence of the first slots; and bundle the residual n−m+2 first slots and allocate one first feedback bits to it.

In some embodiments, the feedback policy information includes the number of the feedback bits for the HARQ feedback, and the number of the first slots in the data subframe is a first number n, and the number of the feedback bits is 1 bit;

wherein the generating module includes:

a third allocating sub-module, which is configured to allocate the first feedback bit to n first slots, wherein the first feedback bit is configured to acknowledge the data received by the n first slots; and a fourth allocating sub-module, which is configured to: when the first slot is not included in the next data subframe, allocate the second feedback bit for a second slot in the current data subframe and a second slot in the next data subframe.

In some embodiments, the first feedback bit is an additional bit in the HARQ feedback, and the feedback policy information includes the number of the additional bits, and the number of the first slots of the data subframe is a first number n, and the number of additional bits is k;

wherein the generating module includes:

a second detecting sub-module, which is configured to detect whether the first number is greater than the number of additional bits.

In some embodiments, the feedback policy information further includes a binding policy for slots corresponding to the same type of service;

wherein the sixth allocating sub-module is further configured to:

allocate the k−1 additional bits to the first k−1 first slots respectively according to the binding policy and a time-domain sequence of the first slots, wherein the k−1 additional bits are configured to acknowledge the data received by the first k−1 first slots respectively; and bundle the residual n−k+1 first slots and allocate one additional bit to it, wherein the additional bit is configured to acknowledge the data received by the residual n−k+1 first slots.

In some embodiments, the first type of service is an ultra-reliable and low latency communication (URLLC) service; and the second type of service is an enhanced mobile broadband (eMBB) service and/or a mass machine communication (mMTC) service.

In some embodiments, the feedback policy information is transmitted via a physical broadcast channel (PBCH), a radio resource control protocol (RRC) signaling or a physical downlink control channel (PDCCH).

In a fourth aspect, there is provided a hybrid automatic repeat request (HARQ) feedback apparatus, including:

a second transmitting module, which is configured to transmit a data subframe to a first equipment, wherein the data subframe includes a first slot corresponding to a first type of service and a second slot corresponding to a second type of service;

a third receiving module, which is configured to receive the HARQ feedback transmitted by the first equipment, wherein the HARQ feedback includes a first feedback bit corresponding to the first slot and a second feedback bit corresponding to the second slot; and a retransmitting module, which is configured to perform retransmission according to the HARQ feedback.

In some embodiments, the apparatus further includes:

a second acquiring module, which is configured to acquire feedback policy information for generating the HARQ feedback;

wherein the retransmitting module includes:

an analysis sub-module, which is configured to analyze the HARQ feedback according to the feedback policy information; and a retransmitting sub-module, which is configured to perform retransmission according to the analysis result.

In some embodiments, wherein the feedback policy information includes:

the number of feedback bits for the HARQ feedback; and/or, a binding policy for slots corresponding to the same type of service.

In some embodiments, the feedback policy information includes:

the number of additional bits, which is configured to indicate the number of additional bits in the HARQ feedback, wherein the additional bits are the first feedback bits; and/or, a binding policy for slots corresponding to the same type of service.

In some embodiments, the latency of the first type of service is lower than that of the second type of service;

wherein the retransmitting sub-module is further configured to: when the analysis result indicates that the data in the first slot is not received correctly and the data in the second slot is not received correctly, retransmit the data in the first slot by the second equipment, and then retransmit the data in the second slot.

In some embodiments, the first type of service is an ultra-reliable low latency communication (URLLC) service; and the second type of service is an enhanced mobile broadband (eMBB) service and/or a mass machine communication (mMTC) service.

In a fifth aspect, there is provided a device, including:

a processor;

a transceiver, which is connected with the processor;

a memory, which is configured to store an instruction executable by the processor;

wherein the processor is configured to:

receive a data subframe transmitted by a second equipment, wherein the data subframe includes a first slot corresponding to a first type of service and a second slot corresponding to a second type of service;

generate the HARQ feedback according to the data subframe, wherein the HARQ feedback includes a first feedback bit corresponding to the first slot and a second feedback bit corresponding to the second slot; and transmit the HARQ feedback to the second equipment.

In a sixth aspect, there is provided a device, including:

a processor;

a transceiver, which is connected with the processor;

a memory, which is configured to store an instruction executable by the processor;

wherein the processor is configured to:

transmit a data subframe to a first equipment, wherein the data subframe includes a first slot of a first type of service and a second slot of a second type of service;

receive the HARQ feedback transmitted by the first equipment, wherein the HARQ feedback includes a first feedback bit corresponding to the first slot and a second feedback bit corresponding to the second slot; and perform retransmission according to the HARQ feedback.

In a seventh aspect, there is provided a mobile communication system, including a first equipment and a second equipment;

the first equipment includes the HARQ feedback apparatus according to the device of the third aspect; and the second equipment includes the HARQ feedback apparatus according to the device of the fourth aspect.

In an eighth aspect, there is provided a mobile communication system, including a first equipment and a second equipment;

the first equipment includes the device according to the fifth aspect;

the second equipment includes the device according to the sixth aspect.

At least some of the embodiments of the present disclosure can have one or more of the following advantages.

After a first equipment receives a data subframe transmitted by a second equipment, a first feedback bit is generated according to a first slot of the data subframe corresponding to a first type, a second feedback bit is generated according to a second slot of the data subframe corresponding to a second type of service, and the first feedback bit and the second feedback bit are transmitted to the second equipment as HARQ feedback, so that the second equipment may provide differentiated data retransmission services for different types of service according to the feedback bits, thereby ensuring the timeliness of transmitting the data for ultra-reliable and low latency communication service.

It should be understood that both the foregoing general description and the following detailed description are exemplary and explanatory only and are not restrictive of the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
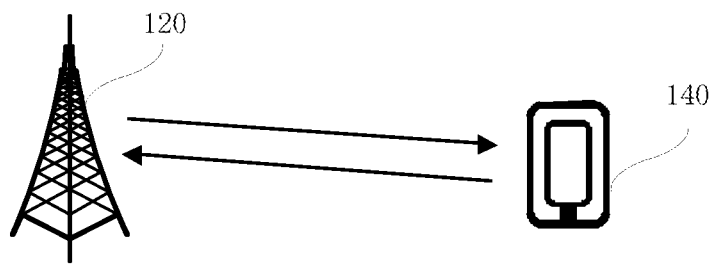
FIG. 1 is a schematic diagram showing a structure of a mobile communication system according to some embodiments.

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

A "module" mentioned herein can refer to a program or instruction stored in a memory that can achieve a certain function. A "unit" mentioned herein can refer to a functional structure partitioned logically, and this "unit" can be implemented by hardware alone or by a combination of software and hardware.

The various device components, units, blocks, or portions may have modular configurations, or are composed of discrete components, but nonetheless may be referred to as "modules" in general. In other words, the "modules" referred to herein may or may not be in modular forms.

"Multiple" mentioned herein refers to two or more. "And/or" describes an association relationship between associated objects, indicating that there can be three relationships, for example, A and/or B, which can be expressed as: A exists alone, A and B exist simultaneously, and B exists alone. A character "/" generally indicates that a relationship between front and back associated objects is an "or" relationship.

A "slot" mentioned herein can refer to a unit in a time-division multiplexing system on a time domain, which is shorter than a "subframe", for example, a slot in an LTE system, for another example, a mini-slot in the 5G system.

In the 5th generation mobile communication (5G) system, in order to guarantee the transmission requirement for ultra reliable and low latency communication (URLLC) service, the concept of mini-slot is applied to 5G system. In a process of transmitting the downlink data, a time slot of enhanced mobile broad band (eMBB) service may be interrupted by a time slot of the URLLC service which is transmitted preferentially. If the HARQ mechanism of the LTE system is still adopted by the 5G system, that is, the slot of the URLLC service and the slot of the eMBB service in the subframe for performing ACK/NACK feedback is applied to one same bit, when the base station performs retransmission according to the ACK/NACK feedback, it is impossible to perform a differentiated retransmission for the URLLC service and the eMBB service, which causes incapability of guaranteeing the reliability and latency of retransmitting the URLLC service.

Referring to FIG. 1, which shows a schematic diagram showing a structure of a mobile communication system according to examples. The mobile communication system may be a 5G system, which is also known as a new radio (NR) system. The mobile communication system includes an access network device 120 and a terminal 140.

The access network device 120 may be a base station. For example, the base station may be a base station adopts a centralized and distributed architecture in the 5G system, such as a gNB. When the access network device 120 adopts the centralized and distributed architecture, it usually includes a central unit (CU) and at least two distributed units (DU). A protocol stack of a packet data convergence protocol (PDCP) layer, a radio link control (RLC) layer and a media access control (MAC) layer is disposed in the central unit. A protocol stack of a physical (PHY) layer is disposed in the distributed units. A specific implementation of the access network device 120 in examples of the present disclosure is not limited. The access network device 120 further includes a transceiver, which is a multiple-input multiple-output (MIMO) antenna supporting beam forming. In some embodiments, the transceiver is a beam scanning node, such as a TRP.

The access network device 120 and the terminal 140 establish a wireless connection through a wireless radio. In some embodiments, the wireless radio is a wireless radio based on the standard of the 5th generation (5G) mobile communication network technology, for instance, the wireless radio is a NR, or the wireless radio may be a wireless radio based on the standard of the 5G or the further generation mobile communication network technologies.

The terminal 140 may be a device providing voice and/or data connectivity to a user. The terminal 140 may communicate with one or more core networks via a radio access network (RAN). The terminal 140 may be a mobile terminal, such as a mobile phone (or known as a "cell" phone) and a computer with a mobile terminal, for example, may be a portable, pocket, hand-held, computer built-in or vehicle-mounted mobile device; for example, a subscriber unit, a subscriber station, a mobile station, a mobile, a remote station, an access point, a remote terminal, an access terminal, a user terminal, a user agent, a user device or user equipment.

It should be noted that the mobile communication system shown in FIG. 1 may include multiple access network devices 120 and/or multiple terminals 140. For example, one access network device 120 and one terminal 140 are shown in FIG. 1, and it is not specifically limited in the examples of the present disclosure.

When the HARQ feedback method provided by the examples of the present disclosure is applied to downlink data subframe transmission (that is, the terminal performs HARQ feedback on a data subframe transmitted by the access network device), the first equipment is a terminal 140, and the second equipment is an access network device 120. When the HARQ feedback method is applied to uplink data subframe transmission (that is, the access network device performs HARQ feedback on a data subframe transmitted by the terminal), the first equipment is a terminal 140, and the second equipment is a terminal 140. For convenience of description, in each of the following examples, the HARQ feedback method is schematically illustrated by way of an example of being applied to a downlink data subframe transmission scenario, and it is not specifically limited in the examples of the present disclosure.

Figure 2:
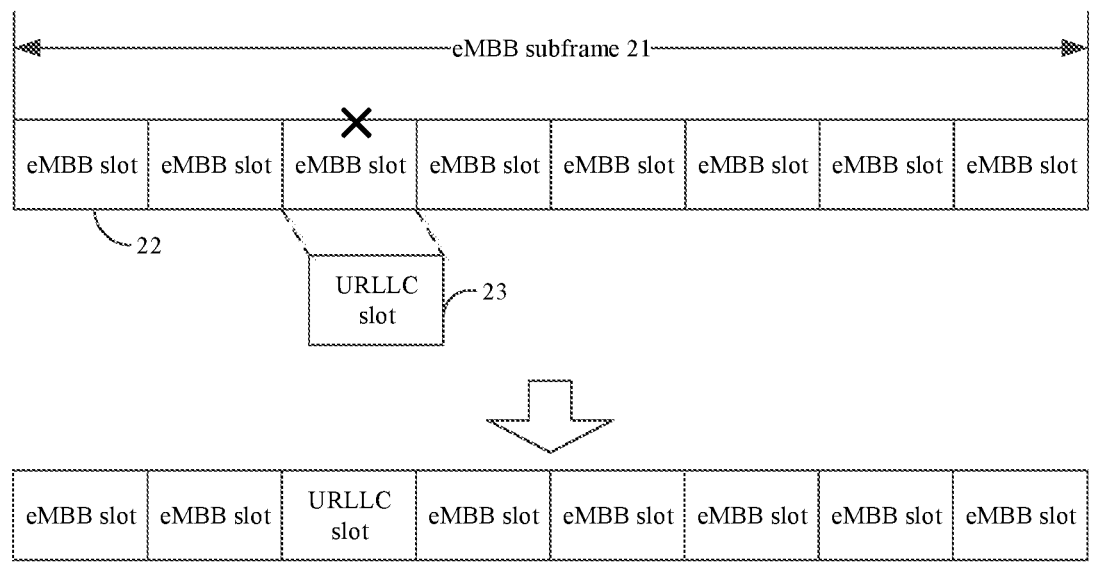
FIG. 2 is a schematic diagram showing a structure of a subframe in the 5G system according to some embodiments.

According to the demands for the reliability and the latency, the service of the 5G system may be categorized into: URLLC service, eMBB service and mMTC service. Wherein, the URLLC service is applied to internet of vehicles and other fields, which request high demands for reliability and latency. In order to meet the transmission demands of the URLLC service, the 5G system has improved particularly in the frame structure: a slot smaller than that in the LTE is adopted, that is, unlike two slots in each subframe in the LTE, there are several slots in each subframe in the 5G system. Schematically, as shown in FIG. 2, one eMBB subframe 21 includes eight eMBB slots 22.

Due to high demands for reliability and latency of the URLLC service, the slot corresponding to the URLLC service is preemptive, the URLLC service transmission may interrupt the eMBB subframe (or the mMTC subframe). Schematically, as shown in FIG. 2, when the access network device needs to perform downlink URLLC service data transmission, one eMBB slot 22 in the eMBB subframe 21 is replaced by a URLLC slot 23.

In order to guarantee correct reception of downlink data, it may still be needed to adopt the HARQ mechanism in the 5G system. However, in the LTE system, the terminal performs ACK/NACK feedback in subframes, that is, two slots in one subframe are bundled, and ACK/NACK feedback is performed by 1 bit. For example, when it is detected that the data included in the two slots in the subframe are received correctly, the terminal feeds ACK (marked as 1) back to the access network device to instruct the access network device to continue to perform downlink transmission. When it is detected that the data included in one slot in the subframe is not received correctly, the terminal feeds NACK (marked as 0) back to the access network device to indicate the access network device to perform the retransmission.

If the HARQ mechanism in the LTE system is applied directly to the 5G system, that is, the ACK/NACK feedback for each subframe is 1 bit. When both a URLLC slot and an eMBB slot (or an mMTC slot) are simultaneously included in the subframe, the data included in the URLLC slot is received correctly, and the eMBB slot is not received correctly, the retransmission performed by the access network device according to the NACK feedback of the terminal may affect the subsequent transmission of the URLLC slot. Obviously, the HARQ mechanism in the LTE system is not suitable for the 5G system.

In order to solve the above technical problems, in examples of the present disclosure, for different types of service (with different demands for latency and reliability), the terminal performs HARQ feedback by different feedback bits, so that after receiving the HARQ feedback information, the access network device can provide differentiated data retransmission services for different types of service according to the feedback bits, thereby ensuring the timeliness of transmitting the data for the ultra-reliable and low latency communication service. Illustrative examples will be described below.

Figure 3:
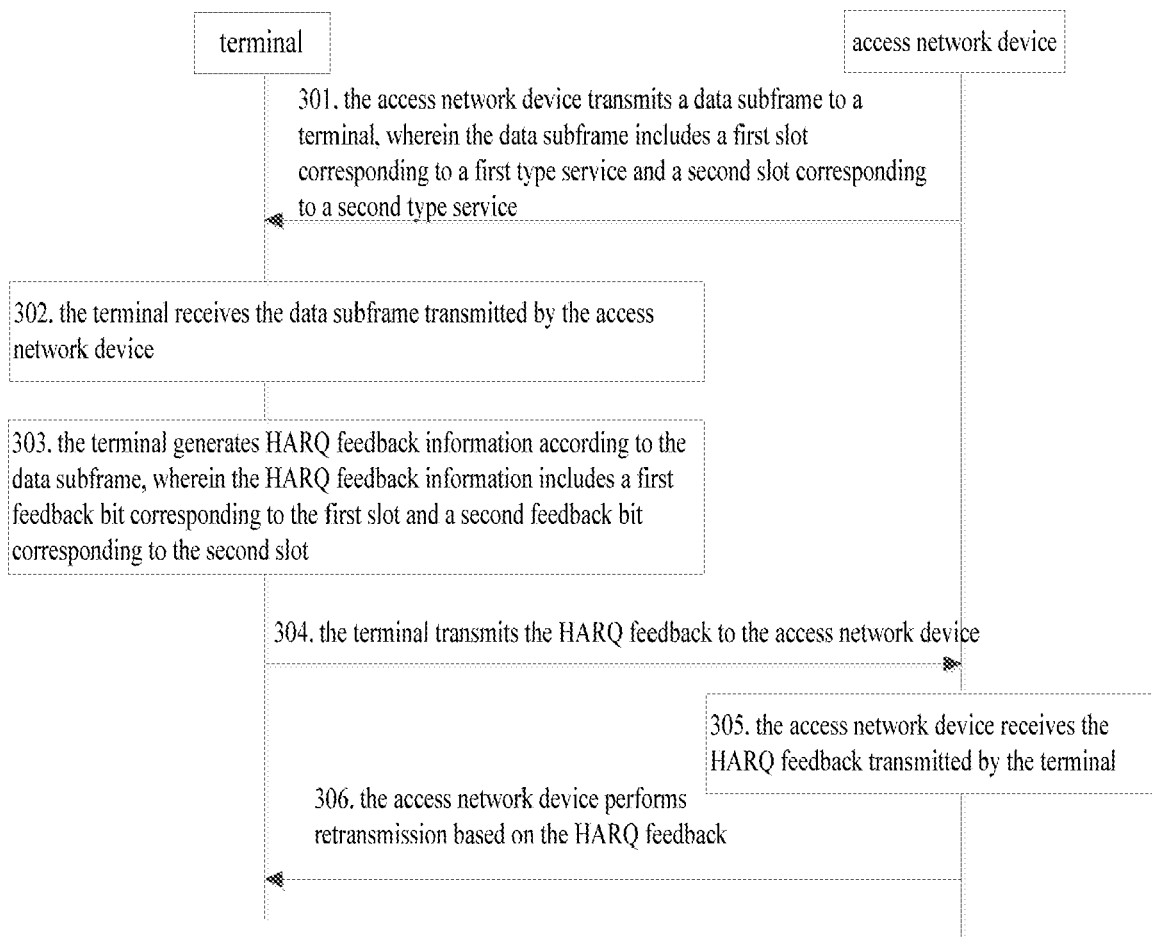
FIG. 3 shows a flowchart of a HARQ feedback method according to some embodiments.

Referring to FIG. 3, which shows a flowchart of a HARQ feedback method according to examples. This example is illustrated by way of an example of applying the HARQ feedback method to a mobile communication system shown in FIG. 1. The method includes the following steps.

In step 301, the access network device transmits a data subframe to a terminal, wherein the data subframe includes a first slot corresponding to a first type of service and a second slot corresponding to a second type of service.

In some embodiments, the demand for latency of the first type of service is lower than that of the second type of service, and the demand for reliability of the first type of service is higher than that of the second type of service. For example, the first type of service is URLLC service, the second type of service is eMBB service and/or mMTC service. Schematically, as shown in FIG. 2B, the data subframe transmitted by the access network device to the terminal includes a URLLC slot 23 (located in a third slot position) corresponding to one URLLC service and seven eMBB slots 22 corresponding to eMBB service.

In other possible example, a data subframe includes a URLLC slot and an mMTC slot, or a data subframe includes a URLLC slot, an eMBB slot and an mMTC slot simultaneously. The number of the first and second slots of the data subframe and a specific structure of the data subframe are not limited in the present disclosure.

In step 302, the terminal receives the data subframe transmitted by the access network device.

In one possible example, after receiving the data subframe, the terminal detects data included in each slot, so as to determine whether the data is correctly received.

In step 303, the terminal generates HARQ feedback information according to the data subframe, wherein the HARQ feedback information includes a first feedback bit corresponding to the first slot and a second feedback bit corresponding to the second slot.

In some embodiments, after checking each slot of the data subframe, the terminal generates feedback bits corresponding to different types of slots according to the checking result, and further generates HARQ feedback information corresponding to the data subframe according to each feedback bit.

In some embodiments, in a case that the number of the feedback bits for the HARQ feedback is determined by the access network device and the terminal in advance without additional feedback bits, the terminal preferentially generates the first feedback bit corresponding to the first slot according to the number of the first slots and the number of the feedback bits (the number of the first feedback bits is less than that of the feedback bits). The terminal generates the second feedback bits corresponding to the bundle second slot by binding the second slot of the data subframe according to the number of the residual feedback bits.

As shown in FIG. 2, when the data subframe includes one URLLC slot 23 and seven eMBB slots 22, and the number of the feedback bits of the HARQ feedback is 4 bits, the terminal first generates a first feedback bit corresponding to the URLLC slot 23 (occupies 1 bit), and then bundles the seven eMBB slots 22, for example, bundles the first and second eMBB slots, bundles the third and fourth eMBB slots, and bundles the fifth, sixth and fourth eMBB slots, to generate second feedback bits (occupies 3 bits). For example, when the HARQ feedback generated by the terminal is "1110", which indicates that the URLLC slot is correctly received, the first and second eMBB slots are correctly received, the third and fourth eMBB slots are correctly received, and one of the fifth, sixth and seventh eMBB slots is not received incorrectly.

In some other embodiments, when the number of the feedback bits of the HARQ feedback and an additional feedback bit for the first slot are determined in advance by the access network device and the terminal, the terminal generates the first feedback bits (that is, the additional bit) corresponding to the first slots according to the number of the first slots and the number of the additional bits. Meanwhile, the terminal bundles the second slot of the data subframe according to the number of the feedback bits determined in advance to generate the second feedback bit corresponding to the bundled second slot.

As shown in FIG. 2, when the data subframe includes one URLLC slot 23 and seven eMBB slots 22, and the number of the feedback bits of the HARQ feedback determined in advance is 4 bits, the number of the additional bits is 2 bits, the terminal generates the first feedback bit corresponding to the URLLC slot 23 (occupies 1 bit, and the other additional bit is not occupied), and then bundles the seven eMBB slots 22, for example, bundles the first and second eMBB slots, bundles the third and fourth eMBB slots, bundles the fifth and sixth eMBB slots, and bundles the seventh eMBB slot alone, to generate the second feedback bits (occupies 4 bit). The HARQ feedback generated by the terminal is "01110", which indicates that the URLLC slot is not received correctly, the first and second eMBB slots are received correctly, the third and fourth eMBB slots are received correctly, the fifth and sixth eMBB slots are received correctly, and the seventh eMBB slot is not received correctly.

In some embodiments, when the number of the first slots in a data subframe is small, the terminal generates the first feedback bits for each first slot respectively. When the number of the first slots of the data subframe is large, the terminal bundles a number of first slots to generate the first feedback bits corresponding to the bundled first slots.

In step 304, the terminal transmits the HARQ feedback to the access network device.

After the HARQ feedback is generated according to the first feedback bit and the second feedback bit, the terminal transmits the HARQ feedback to the access network device, so that the access network device can retransmit the data according to each feedback bit in the HARQ feedback.

Alternatively, the terminal transmits the HARQ feedback by one same subframe, or the terminal transmits the HARQ feedback by different subframes.

In step 305, the access network device receives the HARQ feedback transmitted by the terminal.

In step 306, the access network device performs retransmission based on the HARQ feedback.

The access network device analyzes the received HARQ feedback, determines which slots of the data subframe are received correctly and which slots are not received correctly, and then performs the data retransmission according to the slots that are not received correctly.

When the demands for the reliability and the latency of the first type of service are higher than those of the second type of service, in order to guarantee the priority of the data retransmission of the ultra-reliable and low latency communication service, when the analysis result indicates that the data in the first slot of the data subframe is not received correctly and the data in the second slot is not received correctly, the second equipment performs the data retransmission according to the first slot preferentially, and then performs the data retransmission according to the second slot.

As such, according to the HARQ feedback method provided by the examples, after receiving a data subframe transmitted by an access network device, a terminal generates a first feedback bit for a first slot of the data subframe corresponding to the a first type of service, and generates a second feedback bit for a second slot of the data subframe corresponding to the second type of service, and transmits the first feedback bit and the second feedback bit as HARQ feedback to the access network device, such that the access network device provides differentiated data retransmission services for services with different demands for latency and reliability according to feedback bits, thereby ensuring the timeliness of retransmitting the data for the ultra-reliable low latency communication service.

In an example, the access network device may need to determine, with the terminal, a generation rule of HARQ feedback (including a feedback format, for instance, the number of feedback bits, the number of additional bits and locations of the additional bits, and the like) in advance, so that the terminal generates the corresponding HARQ feedback based on the generation rule, and ensures that the access network device may correctly analyze the received HARQ feedback, thereby performing retransmission. Illustrative examples will be described below.

Figure 4:
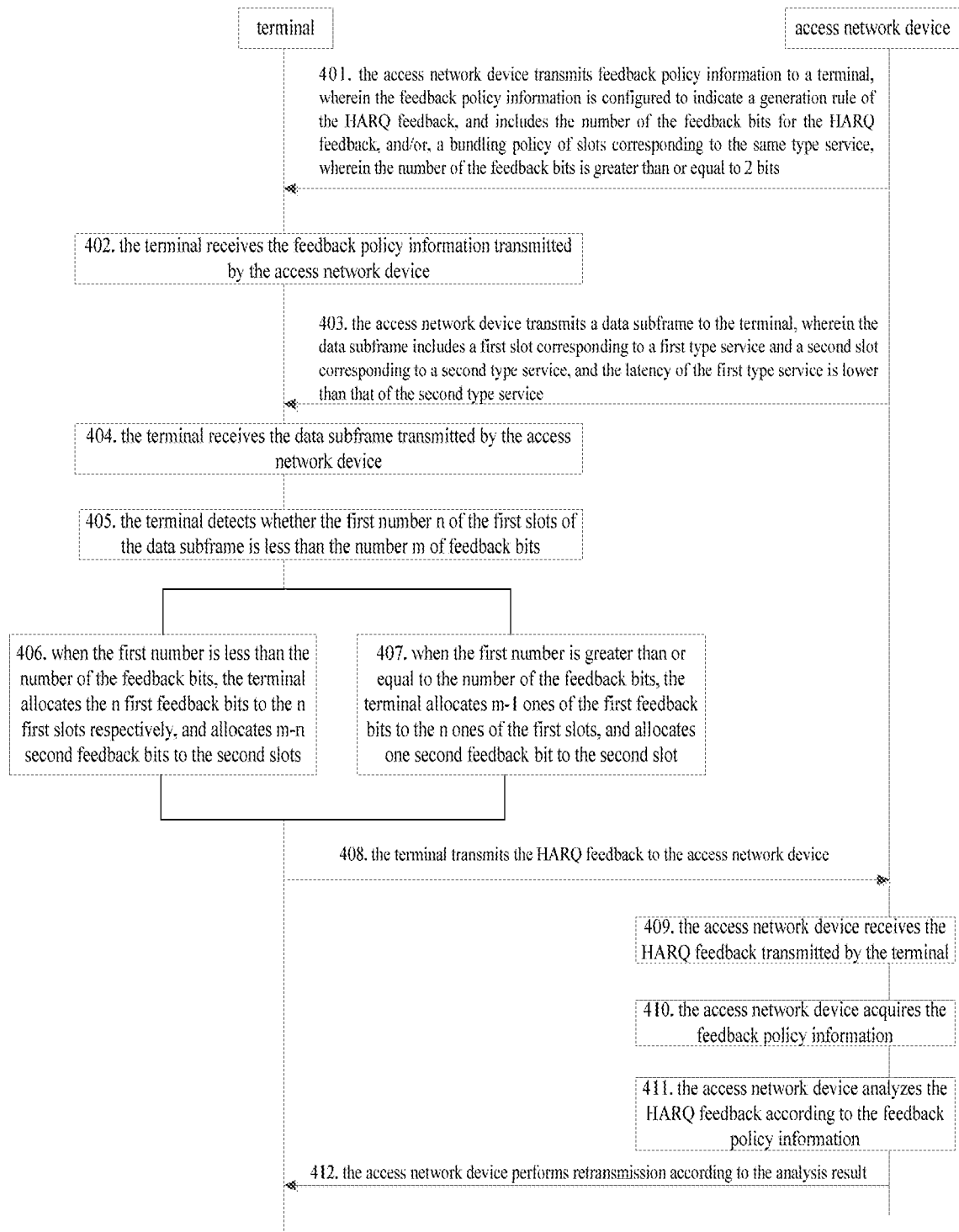
FIG. 4 shows a flowchart of a HARQ feedback method according to some other embodiments.

Referring to FIG. 4, which shows a flowchart of a HARQ feedback method according to some other embodiments. This example is illustrated by way of an example of applying the HARQ feedback method to a mobile communication system shown in FIG. 1. The method includes the following steps.

In step 401, the access network device transmits feedback policy information to a terminal, wherein the feedback policy information is configured to indicate a generation rule of the HARQ feedback, and includes the number of the feedback bits for the HARQ feedback, and/or, a binding policy of slots corresponding to the same type of service, wherein the number of the feedback bits is greater than or equal to 2 bits.

For the timing of transmitting the feedback policy information, in one possible example, the access network device is preset with the feedback policy information, and in a process of initially accessing a cell by the terminal, the feedback policy information is transmitted to the terminal by PBCH.

In another example, the access network device dynamically adjusts the feedback policy information according to the number of the first slots of the data subframe, and transmits the feedback policy information to the terminal by RRC signaling or PDCCH.

When the number of feedback bits for the HARQ feedback is determined in advance in the feedback policy information, the number of the bits for the HARQ feedback as generated by the terminal for the respective data subframe is the same irrespective of the distribution of the number of the first slots and second slots of the data subframe, that is, the sum of the first feedback bits corresponding to the first slots and the second feedback bits corresponding to the second slots is a definite value. For example, the number of the feedback bits here is 4 bites. Since the number of the feedback bits is usually less than the total number of slots of the data subframe, the terminal needs to bundle at least slots corresponding to one same type of service when generating the feedback bits, and generates the feedback bits corresponding to the bundled slots. In order to enable the terminal to perform slot binding according to the predetermined binding rule, so as to ensure that the access network device may correctly identify the slot corresponding to each of the feedback bits, the feedback policy information transmitted by the access network device also includes, when the binding rule is not exist, a binding policy of slots corresponding to one same type of service.

In some embodiments, the binding policy is a policy for the URLLC slot, and/or, a policy for the eMBB slot, and/or, a policy for the mMTC slot. In some embodiments, the binding policy may also be a policy indicating binding the eMBB slot and mMTC slot, both of which have low demands for reliability and latency.

In an example, the binding policy is as follows: when i slots correspond to j feedback bits (i>j), the first j slots (according to time-domain location sequence) are not bundled, and the residual i−j slots are bundled.

In another example, in order to bundle the slots evenly, the binding policy is as follows: when i slots correspond to j e feedback bits (i>j), the (a+b×i)-th slot is bundled, $1 \le a \le I$ and $b \ge 0$. For example, when 7 slots correspond to 3 feedback bits, the first, fourth and seventh slots are bundled, the second and fifth slots are bundled, and the third and sixth slots are bundled.

This example is schematically illustrated merely by way of an example of the two possible binding policies above, and is not intended to limit the present disclosure.

In step 402, the terminal receives the feedback policy information transmitted by the access network device.

In one possible example, the terminal receives the feedback policy information transmitted by the access network device by PBCH in a process of accessing a cell; and in another possible example, the terminal receives the feedback policy information dynamically transmitted by the access network device by RRC signaling or PDCCH.

It should be noted that, when the HARQ feedback method is applied to the uplink data subframe transmission, that is, the data subframe is transmitted to the access network device by the terminal, the access network device directly acquires the feedback policy information locally since the feedback policy information is determined by the access network device, thereby generating the HARQ feedback based on the feedback policy information.

In step 403, the access network device transmits a data subframe to the terminal, wherein the data subframe includes a first slot corresponding to a first type of service and a second slot corresponding to a second type of service, and the latency of the first type of service is lower than that of the second type of service.

In step 404, the terminal receives the data subframe transmitted by the access network device.

The manner of steps 403-404 above are similar to that of steps 301-302 above, and the detailed description thereof will be omitted here in this example.

In step 405, the terminal detects whether the first number n of the first slots of the data subframe is less than the number m of feedback bits.

In order to ensure latency and reliability of the first type of service for transmitting the data, the terminal allocates the feedback bit to each first slot of the data subframe preferentially (that is, the first slots are not bundled); however, for the second type of service, due to low demands of such a type of service for latency and reliability, the terminal may bundle the second slots and allocate the feedback bits to the bundled second slots.

However, in a case that the number of the first slots of the data subframe is large (greater than or equal to the number of feedback bits for the HARQ feedback), the terminal still needs to bundle the first slots. Therefore, when the received feedback policy information includes the number of the feedback bits, the terminal detects whether the first number of the first slots of the data subframe is less than the number of the feedback bits. When the first number is less than the number of the feedback bits, the terminal allocates a feedback bit to each first slot respectively, that is, there is no need to bundle the first slots, and the following step 406 is performed; and when the first number is greater than or equal to the number of the feedback bits, the terminal could not allocate a feedback bit to each first slot, that is, there is a need to bundle some of the first slots, and the following step 407 is performed.

In step 406, when the first number is less than the number of the feedback bits, the terminal allocates the n first feedback bits to the n first slots respectively, and allocates m−n second feedback bits to the second slots.

Wherein, the n first feedback bits are configured to acknowledge that the data received by the n first slots, and the residual m−n second feedback bits are configured to acknowledge that the data received in the second slot.

When the number of the first slots is less than the predetermined number of the feedback bits, the terminal allocates the first feedback bits to each first slot preferentially, that is, the first slots is in one-to-one correspondence with the first feedback bits. Further, after allocating the first feedback bits to the first slots respectively, the terminal allocates the residual feedback bits (i.e., the second feedback bits) to the second slots of the data subframe.

In an example, the terminal bundles the second slots according to the binding policy corresponding to the second type of service, and allocates the residual feedback bits to the second slots after the binding.

Figure 5:
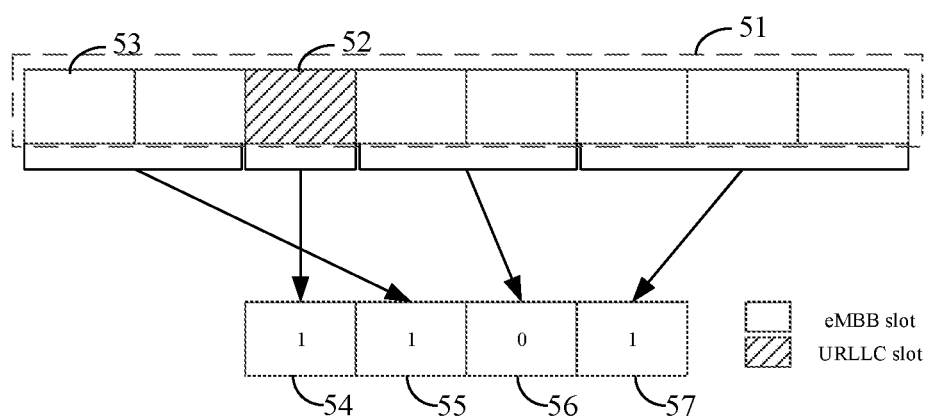
FIG. 5 is a schematic diagram illustrating an implementation of a process of generating the HARQ feedback according to an example illustrated in FIG. 4.

Schematically, as shown in FIG. 5, the data subframe 51 includes one URLLC slot 52 and seven eMBB slots 53, and the number of the feedback bits for the HARQ feedback is predetermined to be 4. Since the number of the URLLC slot 52 is less than the number of the feedback bits, the terminal gives priority to allocating the feedback bits 54 to the URLLC slot 52. For the seven eMBB slots 53, the terminal bundles the first and second eMBB slots 53 and allocates the feedback bits 55 thereto; bundles the third and fourth eMBB slots 53 and allocates the feedback bits 56 thereto; and bundles the fifth, sixth and seventh eMBB slots 53 and allocates the feedback bits 57 thereto.

In step 407, when the first number is greater than or equal to the number of the feedback bits, the terminal allocates m−1 ones of the first feedback bits to the n ones of the first slots, and allocates one second feedback bit to the second slot.

Wherein, the m−1 first feedback bits are configured to acknowledge the data received by the n first slots, and the second feedback bit (the residual one feedback bit after the m−1 first feedback bits are allocated) are configured to acknowledge the data received by the second slot.

When the number of the first slots is greater than or equal to the predetermined number of the feedback bits, the terminal needs to bundle several of the first slots according to the binding policy of the first slots, thereby allocating the first feedback bits to the bundled first slots. Further, after allocating the first feedback bits to the bundled first slots respectively, the terminal bundles several of the second slots according to the binding policy of the second slots, thereby allocating the second feedback bits to the bundled second slots.

In one possible example, when the terminal allocates the m−1 first feedback bits to the n first slots, the following steps are included.

First, the terminal allocates m−2 first feedback bits to first m−2 first slots according to the binding feedback policy and a time-domain sequence of the first slots.

In some embodiments, when the binding policy indicates separately allocating the first feedback bits to the first slots having top time domain locations preferentially, the terminal allocates m−2 first feedback bits to the first m−2 first slots according to the time-domain sequence of the first slots.

Figure 6:
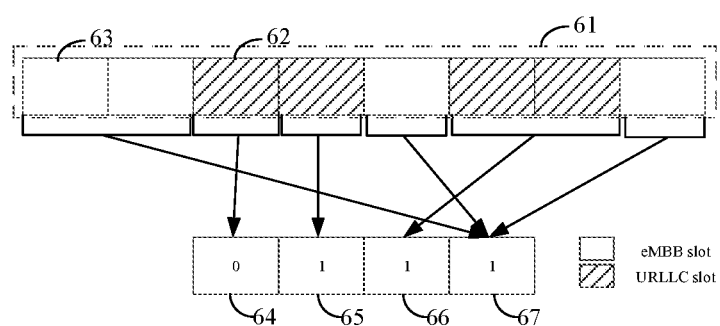
FIG. 6 is a schematic diagram illustrating an implementation of another process of generating the HARQ feedback according to an example illustrated in FIG. 4.

Schematically, as shown in FIG. 6, the data subframe 61 includes four URLLC slots 62 and four eMBB slots 63, and the number of the feedback bits for the HARQ feedback is determined in advance to be 4 bits. Since the number of the URLLC slots 62 is equal to the number of the feedback bits, the terminal allocates the feedback bits 64 and 65 to the first and second URLLC slots 62 preferentially.

Second, the terminal bundles the residual n−m+2 first slots, and then allocates one of the first feedback bits.

Further, the terminal bundles the residual first slots and allocates one of the first feedback bits to the bundled first slots.

Schematically, as shown in FIG. 6, the terminal bundles the residual third and fourth first slots 62 and allocates the feedback bits 66 to it. For the four eMBB slots of the data subframe 61, the terminal performs binding on them and then allocates the feedback bits 67 to it.

In step 408, the terminal transmits the HARQ feedback to the access network device.

After generating the HARQ feedback according to the first feedback bits and the second feedback bits, the terminal transmits the HARQ feedback to the access network device, so that the access network device performs data retransmission according to each feedback bit in the HARQ feedback.

Schematically, as shown in FIG. 5, the HARQ feedback transmitted by the terminal in the same subframe is 1101; and as shown in FIG. 6, the HARQ feedback transmitted by the terminal in the same subframe is 0111.

In step 409, the access network device receives the HARQ feedback transmitted by the terminal.

In step 410, the access network device acquires the feedback policy information.

Since the HARQ feedback transmitted by the terminal is generated based on the feedback policy information that determined by the access network device, the access network device needs to analyze the HARQ feedback by the feedback policy information after receiving the HARQ feedback, thereby determining whether the data in the slot is received correctly.

In step 411, the access network device analyzes the HARQ feedback according to the feedback policy information.

Since the access network device knows the distribution of the number of the first and second slots of the data subframe, the access network device may determine the slot corresponding to each feedback bit based on the feedback policy information, thereby determining whether the data in the slots is received correctly.

Schematically, as shown in FIG. 6, when the received HARQ feedback is 0111, the access network device determines that the data in the first URLLC slot 62 of the data subframe is not received correctly and the data in other slots is received correctly, based on the distribution of the slots of the data subframe and the feedback policy information.

In step 412, the access network device performs retransmission according to the analysis result.

Based on the analysis result of step 411 above, the access network device retransmits the data that is not received correctly.

In an example, when the analysis result indicates that the data in the first slot of the data subframe is not received correctly and the data in the second slot is not received correctly, the second equipment retransmits the data in the second slot after retransmitting the data in the first slot, that is, retransmits the data of service having demands for high-reliability and low-latency preferentially.

As such, in the HARQ feedback method provided by this example, after receiving the data subframe transmitted by the access network device, the terminal generates the first feedback bit for the first slot of the data subframe corresponding to the first type of service, generates the second feedback bit for the second slot of the data subframe corresponding to the second type of service, and then transmits the first and second feedback bits as the HARQ feedback to the access network device, such that the access network device provides differentiated data retransmission services according to the feedback bits for the services having different demands for latency and reliability, thereby ensuring the timeliness of transmitting data for the high-reliability and low-latency service.

In this example, in a case that no additional feedback bits adopted, the terminal bundles the slots with a same type of service according to the binding policy, and allocates the feedback bits to the bundled slots, thereby saving the signaling overheads for the HARQ feedback.

In the example shown in FIG. 4, in a case that the first and second slots are simultaneously included in the data subframe, since the number of the feedback bits predetermined by the terminal and the access network device is at least 2 bits, the terminal can ensure to allocate at least one feedback bit to the second slot in the HARQ feedback, thereby transmitting the HARQ in the same subframe. However, when the number of the feedback bits predetermined by the terminal and the access network device is 1 bit, the terminal needs to adopt another HARQ feedback mechanism in order to simultaneously ensure to provide the feedback on the data reception of the first and second slots. Illustrative examples will be described below.

Figure 7:
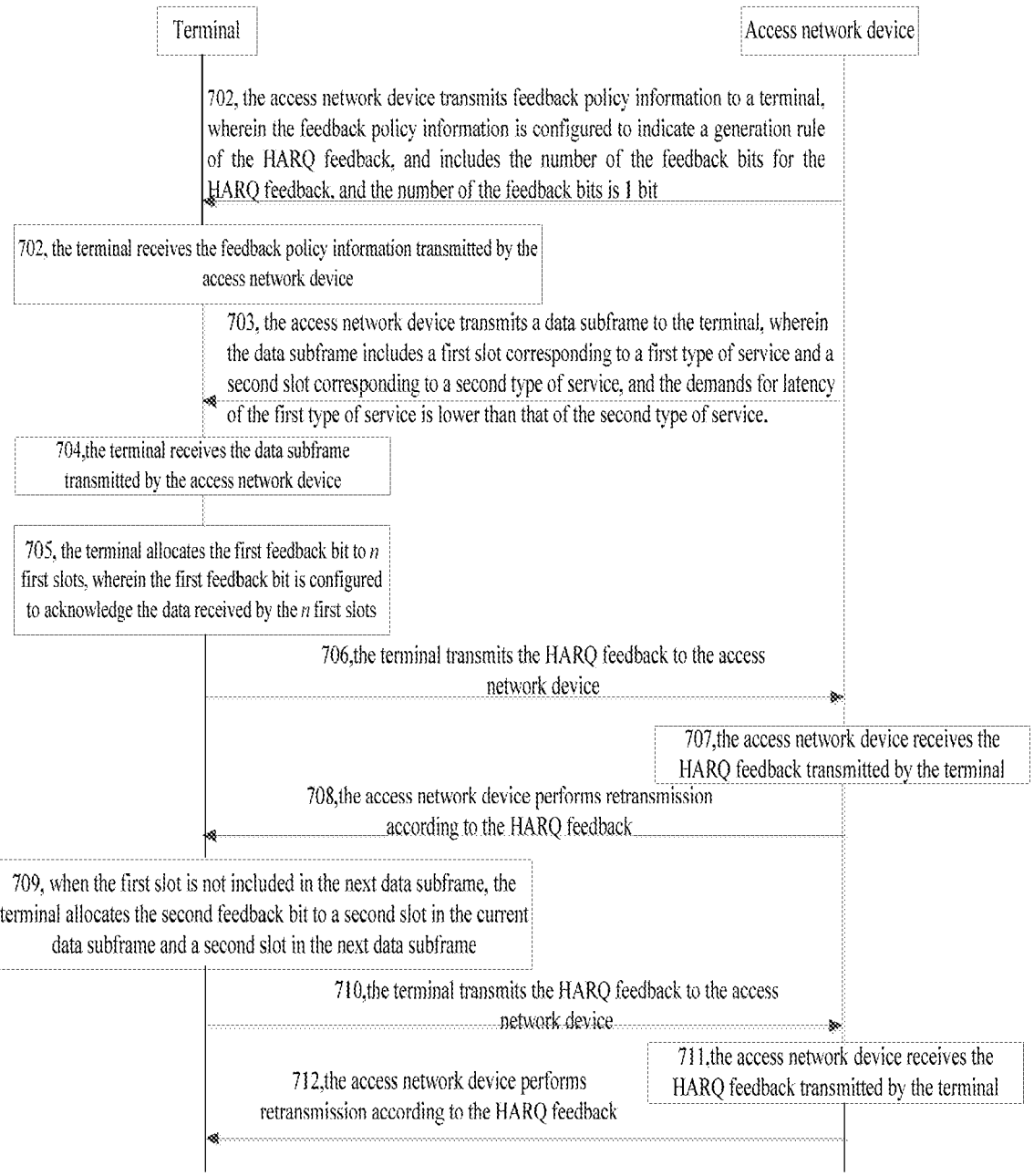
FIG. 7 shows a flowchart of a HARQ feedback method according to some other embodiments.

Referring to FIG. 7, which shows a flowchart of a HARQ feedback method according to some other embodiments. This example is illustrated by way of an example of applying the HARQ feedback method to a mobile communication system shown in FIG. 1. The method includes the following steps.

In step 701, the access network device transmits feedback policy information to a terminal, wherein the feedback policy information is configured to indicate a generation rule of the HARQ feedback, and includes the number of the feedback bits for the HARQ feedback, and the number of the feedback bits is 1 bit.

For the timing of transmitting the feedback policy information, in one possible example, the access network device is preset with the feedback policy information, and in a process of initially accessing a cell by the terminal, the feedback policy information is transmitted to the terminal via PBCH.

In another example, the access network device dynamically adjusts the feedback policy information according to the number of the first slots of the data subframe, and transmits the feedback policy information to the terminal by RRC signaling or PDCCH.

The difference from the example shown in FIG. 4 is that the number of the feedback bits for the HARQ feedback in the feedback policy information is 1, that is, the terminal only uses 1 bit for the HARQ feedback.

In step 702, the terminal receives the feedback policy information transmitted by the access network device.

In an implementation, the terminal receives the feedback policy information transmitted by the access network device via PBCH in a process of accessing a cell; and in another possible implementation, the terminal receives the feedback policy information dynamically transmitted by the access network device with the RRC signaling or the PDCCH.

In step 703, the access network device transmits a data subframe to the terminal, wherein the data subframe includes a first slot corresponding to a first type of service and a second slot corresponding to a second type of service, and the demands for latency of the first type of service is lower than that of the second type of service.

In step 704, the terminal receives the data subframe transmitted by the access network device.

The implementations of steps 703-404 above are similar to that of steps 403-404 above, and the detailed description thereof will be omitted here in this example.

In step 705, the terminal allocates the first feedback bit to n first slots, wherein the first feedback bit is configured to acknowledge the data received by the n first slots.

When the first and second slots are included in the data subframe simultaneously, the terminal allocates the first feedback bit (1 bit) to the n first slots of the data subframe, thereby ensuring the HARQ feedback for the first type of service preferentially.

In some embodiments, when the data subframe includes only one first slot, the terminal separately allocates one first feedback bit to the first slot; and when the data subframe includes at least two first slots, the terminal bundles at least two first slots and then allocates one first feedback bit to the bundled first slots. In step 706, the terminal transmits the HARQ feedback to the access network device.

Because the number of the feedback bits for the HARQ feedback is 1 bit, after allocating the first feedback bit to the first slot, the terminal transmits the HARQ feedback including the first feedback bit to the access network device, so that the access network device may perform data retransmission according to the HARQ feedback.

Figure 8:
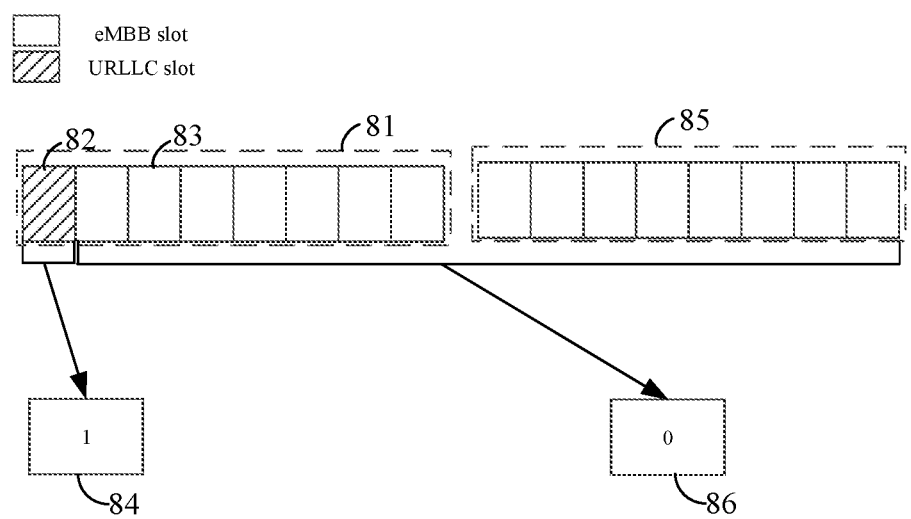
FIG. 8 is a schematic diagram of an implementation of a process of generating the HARQ feedback in an example shown in FIG. 7.

Schematically, as shown in FIG. 8, the first data subframe 81 received by the terminal includes one URLLC slot 82 and seven eMBB slots 83, and after allocating one feedback bit 84 to the URLLC slot 82, the terminal transmits the HARQ feedback including the feedback bit 84 to the access network device.

In step 707, the access network device receives the HARQ feedback transmitted by the terminal.

In step 708, the access network device performs retransmission according to the HARQ feedback.

In some embodiments, the access network device analyzes the received HARQ feedback, and when the first feedback bit in the HARQ feedback is "1", the access network device determines that the data in the first slot is received correctly and needs no retransmission; and when the first feedback bit in the HARQ feedback is "0", the access network device determines that the data in the first slot is not received correctly, and retransmits the data of all the first slots of the data subframe until the data is received correctly.

In step 709, when the first slot is not included in the next data subframe, the terminal allocates the second feedback bit to a second slot in the current data subframe and a second slot in the next data subframe.

After steps 705 and 706 above, the terminal only provides the feedback on the reception for the data in the first slot of the current data subframe, and provides no feedback on the reception of the data in the second slot.

In an example, after receiving the next data subframe transmitted by the access network device, the terminal detects whether the next data subframe includes the first slot, and if the next data subframe does not include the first slot, bundles the second slot in the current data subframe and the second slot in the next data subframe, and allocates the second feedback bit thereto.

Schematically, as shown in FIG. 8, the terminal receives the second data subframe 85, and detects that the data subframe 85 does not include the URLLC slot 82, and the terminal bundles seven eMBB slots 83 of the first data subframe 81 and eight eMBB slots 83 of the second data subframe 85, and allocates the feedback bit 86, thereby transmitting the HARQ feedback including the feedback bits 86 to the terminal.

In step 710, the terminal transmits the HARQ feedback to the access network device.

Wherein, the HARQ feedbacks in steps 706 and 710 are transmitted by different subframes.

In step 711, the access network device receives the HARQ feedback transmitted by the terminal.

In step 712, the access network device performs retransmission according to the HARQ feedback.

After receiving the HARQ feedback, the access network device analyzes the HARQ feedback, and thus performs retransmission according to the analysis result.

Schematically, as shown in FIG. 8, when the access device analyzes the HARQ feedback, when the feedback bit is "0", the access network device then retransmits the data in the fifteen eMBB slots 83 in the first data subframe 81 and the second data subframe 85.

In this example, when the number of the feedback bits of the HARQ feedback is 1 bit, the terminal feedbacks the data reception for the service with demands for high-reliability and low-latency preferentially by the feedback bits, thereby ensuring the timeliness of data retransmission for the high-reliability and low-latency service.

In another example, the access network device predetermines the number of original feedback bits in the HARQ feedback, and predetermines the number of additional feedback bits, thereby indicating the terminal to feedback the data reception for the first type of service by the additional feedback bits, and feedback the data reception for the second type of service by the original feedback bits. Illustrative examples will be described below.

Figure 9:
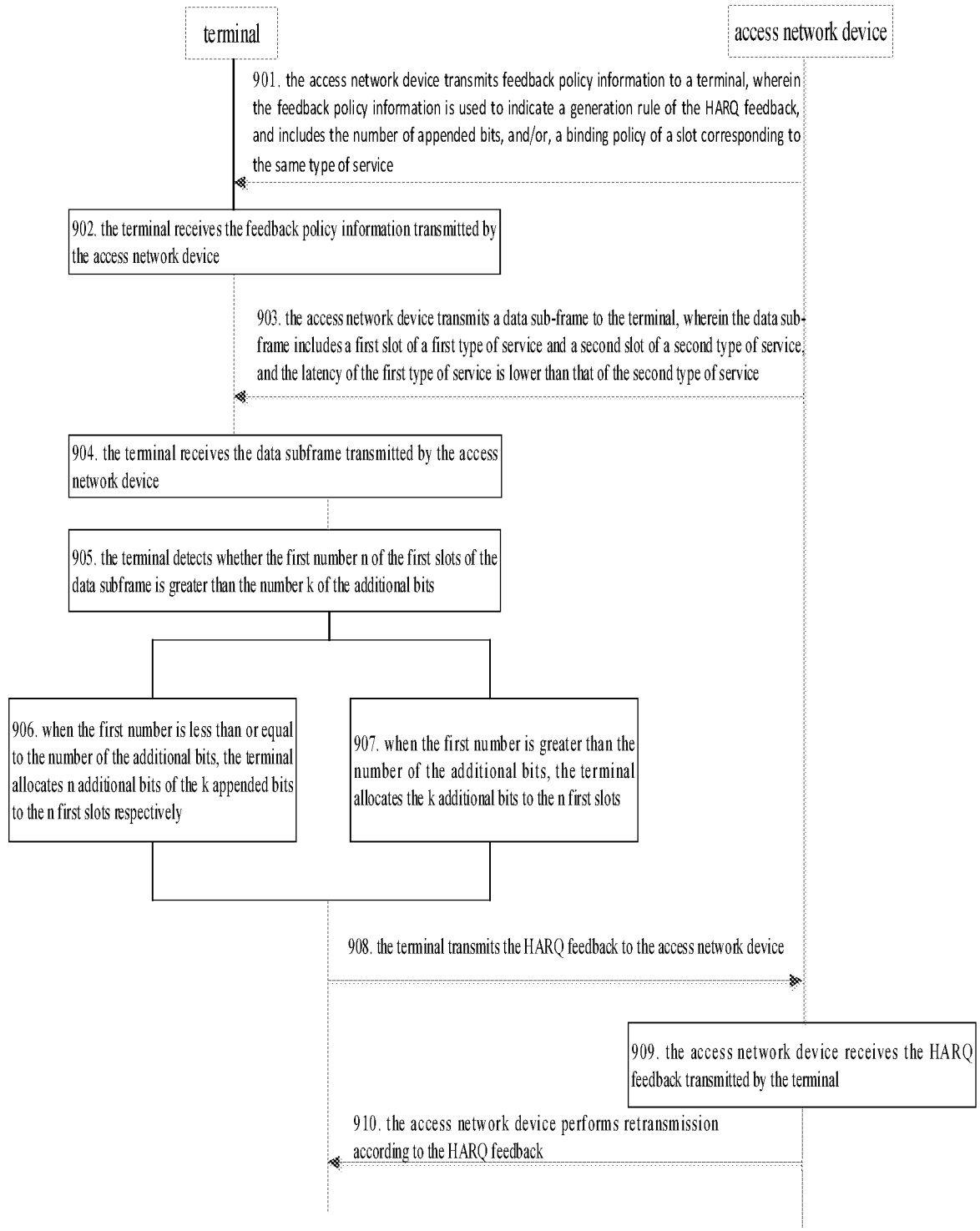
FIG. 9 shows a flowchart of a HARQ feedback method according to some other embodiments.

Referring to FIG. 9, which shows a flowchart of a HARQ feedback method according to some other embodiments. This example is illustrated by way of an example of applying the HARQ feedback method to a mobile communication system shown in FIG. 1. The method includes the following steps.

In step 901, the access network device transmits feedback policy information to a terminal, wherein the feedback policy information is configured to indicate a generation rule of the HARQ feedback, and includes the number of additional bits, and/or, a binding policy for slots corresponding to the same type of service.

Different from the case of not appending the additional feedback bits in the example shown in FIG. 4, in this example, the access network device instructs to add the additional bits on the basis of the original feedback bits, so that the terminal utilizes the additional bits to indicate whether the first slot is received correctly, and utilizes the original feedback bits to indicate whether the second slot is received correctly.

In an example, the access network device is preset with a fixed number of the additional bits, and in a process of initially accessing a cell by the terminal, transmits the feedback policy information including the number of the additional bits to the terminal via the PBCH (regardless of whether the data subframe includes the first slot, the HARQ feedback transmitted by the terminal includes the additional bit and the original feedback bit.

In another example, in order to improve the flexibility of the 5G system and reduce the signaling overheads for the HARQ feedback, the access network device dynamically adjusts the number of the additional bits according to the number of the first slots of the data subframe, and transmits the feedback policy information including the number of the additional bits, to the terminal via a RRC signaling or a PDCCH.

In some embodiments, when the number of the first slots of the data subframe is less than a threshold (for example, 2), the feedback policy information transmitted by the access network device includes the number of first additional bits (for example, 2 bits); and when the number of the first slots of the data subframe is greater than the threshold, the feedback policy information transmitted by the access network device includes the number of second additional bits (for example, 4 bits), wherein the number of second additional bit is greater than that of the first additional bits.

Alternatively, the feedback policy information further includes an appending position of the additional bit.

In step 902, the terminal receives the feedback policy information transmitted by the access network device.

In an implementation, the terminal receives the feedback policy information transmitted by the access network device via the PBCH in a process of accessing a cell; and in another possible implementation, the terminal receives the feedback policy information transmitted by the access network device via the RRC signaling or the PDCCH.

In step 903, the access network device transmits a data subframe to the terminal, wherein the data subframe includes a first slot corresponding to a first type of service and a second slot corresponding to a second type of service, and the latency of the first type of service is lower than that of the second type of service.

In step 904, the terminal receives the data subframe transmitted by the access network device.

The implementations of steps 903-404 above are similar to that of steps 301-302 above, and the detailed description thereof will be omitted here in this example.

In step 905, the terminal detects whether the first number n of the first slots of the data subframe is greater than the number k of the additional bits.

Because the number of the first slots of the data subframe may be greater than that of the additional bits, some of the first slots need to be bundled. Therefore, after receiving the data subframe, the terminal detects whether the first number of the first slots is greater than the number of the additional bits. When the first number is less than or equal to the number of the additional bits, the terminal determines that one additional bit may be separately allocated to each first slot, that is, there is no need to bundle the first slots, and the following step 906 is performed; and when the first number is greater than the number of the additional bits, the terminal may not allocate one additional bit to each first slot respectively, that is, there is a need to bundle some of the first slots, and the following step 907 is performed.

In step 906, when the first number is less than or equal to the number of the additional bits, the terminal allocates n additional bits of the k appended bits to the n first slots respectively.

When the number of the first slots is less than the number of the additional bits, the terminal separately allocates the first feedback bits to each first slot respectively, that is, the first slots is in one-to-one correspondence with the first feedback bits. In some embodiments, for the second slot in the data subframe, the terminal bundles the second slot according to the binding policy for the second slot, and allocates the original feedback bit to the second slot.

Figure 10:
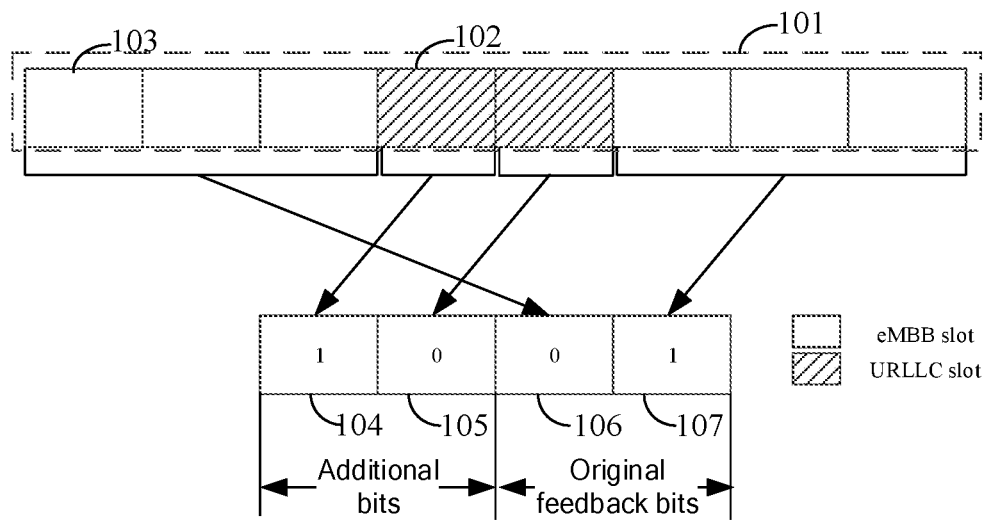
FIG. 10 is a schematic diagram of an implementation of a process of generating the HARQ feedback in an example shown in FIG. 9.

Schematically, as shown in FIG. 10, the data subframe 101 includes two URLLC slots 102 and six eMBB slots 103, and in the HARQ feedback, the number of the original feedback bits is 2 bits and the number of the additional bits is 2 bits. Since the number of the URLLC slots 102 is equal to the number of the additional bits, the terminal allocates the additional bits 104 and 105 to the first and second URLLC slots 102, respectively. For the six eMBB slots 103, the terminal bundles the first, second and third eMBB slots 103 and allocates the original feedback bit 106 thereto; and bundles the fourth, fifth and sixth eMBB slots 103 and allocates the feedback bit 107 thereto.

In step 907, when the first number is greater than the number of the additional bits, the terminal allocates the k additional bits to the n first slots.

When the number of the first slots is greater than the number of the additional bits, the terminal needs to bundle several of the first slots according to the binding policy for the first slots, thereby allocating the additional bits to the bundled first slots. In some embodiments, for the second slot in the data subframe, the terminal bundles the second slot according to the binding policy for the second slot, and allocates original feedback bits to the bundled second slot.

In one possible example, when the terminal allocates the k additional bits to the n first slots, the following steps are included.

First, the terminal allocates k−1 additional bits to first k−1 first slots according to the binding policy and a time-domain sequence of the first slots, wherein the k−1 ones of the additional bits are used to confirm the data received by the first k−1 ones of the first slots respectively.

In some embodiments, when the binding policy indicates that the additional bits are allocated separately to the first slots having top time domain locations preferentially, the terminal allocates the k−1 first feedback bits to the first k−1 first slots according to the time-domain sequence of the first slots.

Figure 11:
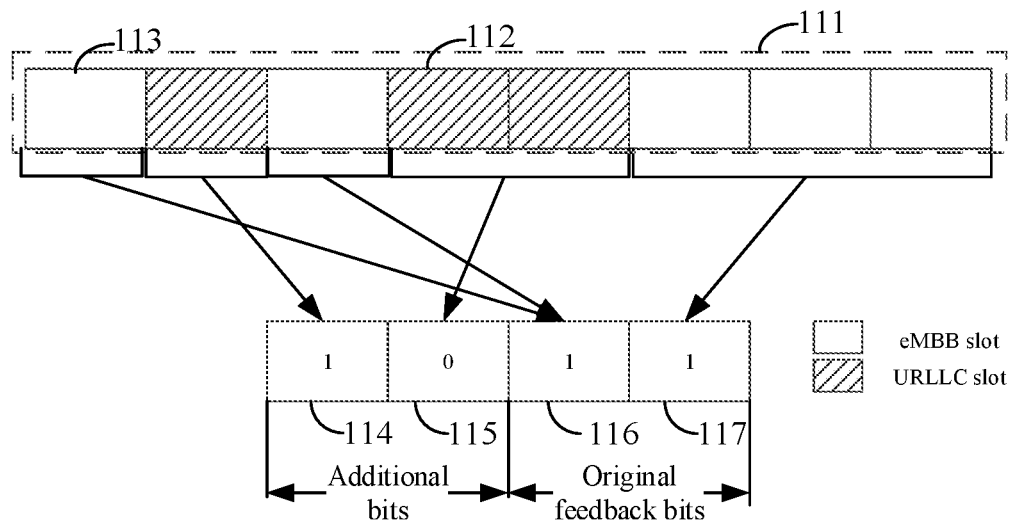
FIG. 11 is a schematic diagram of an implementation of another process of generating the HARQ feedback in an example shown in FIG. 9.

Schematically, as shown in FIG. 11, the data subframe 111 includes three URLLC slots 112 and five eMBB slots 113, and for the HARQ feedback, the number of the original feedback bits is 2 bits and the number of the additional feedback bits is 2 bits. Since the number of the URLLC slots 112 is greater than the number of the additional bits, the terminal allocates the additional bits 114 to the first URLLC slot 112 preferentially.

Second, the terminal bundles the residual n−k+1 first slots, and allocates one additional bit to it, wherein the additional bit is configured to acknowledge that the data received by the residual n−k+1 first slots.

Further, the terminal bundles the residual first slots and allocates the residual additional bits to the bundled first slots.

Schematically, as shown in FIG. 11, the terminal bundles the residual second and third first slots 112 and allocates the additional bits 115 thereto. For the five eMBB slots 113 in the data subframe 111, the terminal bundles the first and second eMBB slots 113 and allocates the original feedback bit 116 thereto; and bundles the third, fourth and fifth eMBB slots 113 and allocates the original feedback bit 117 thereto.

In step 908, the terminal transmits the HARQ feedback to the access network device.

After generating the HARQ feedback according to the first feedback bits and the second feedback bit, the terminal transmits the HARQ feedback to the access network device, so that the access network device performs data retransmission according to each feedback bit in the HARQ feedback.

Schematically, as shown in FIG. 10, the HARQ feedback transmitted by the terminal in the same subframe is 1001; and as shown in FIG. 11, the HARQ feedback transmitted by the terminal in the same subframe is 1011.

In step 909, the access network device receives the HARQ feedback transmitted by the terminal.

In step 910, the access network device performs retransmission according to the HARQ feedback.

Because the access network device knows the distribution of the first and second slots in the data subframe, the access network device may analyze the reception of the slots of the data subframe based on the feedback policy information, thereby performing retransmission according to the analysis result.

Schematically, as shown in FIG. 10, when the received HARQ feedback is 1001, the access network device determines, based on the distribution of the slots of the data subframe and the feedback policy information, that the data in the first URLLC slot 102 of the data subframe is received correctly, the data in the second URLLC slot 102 is not received correctly, the data in at least one of the first, second and third eMBB slots 103 is not received correctly, and the data of the fourth, fifth and sixth eMBB slots 103 is received correctly. Further, the terminal gives priority to retransmitting the data of the first URLLC slot 102, and then retransmits the data of the first, second, and third eMBB slots 103.

As such, in the HARQ feedback method provided by this example, after receiving the data subframe transmitted by the access network device, the terminal generates the first feedback bit for the first slot of the data subframe corresponding to the first type of service, generates the second feedback bit for the second slot of the data subframe corresponding to the second type of service, and transmits the first and second feedback bits as the HARQ feedback to the access network device, such that the access network device provides differentiated data retransmission services according to the feedback bits for the services having different demands for the latency and reliability, thereby ensuring the timeliness of transmitting data of the service with demands for high-reliability and low-latency.

The technical solution provided in the examples of the present disclosure has the following beneficial effects.

After a first equipment receives a data subframe transmitted by a second equipment, a first feedback bit is generated according to a first slot of service of the data subframe corresponding to a first type, a second feedback bit is generated according to a second slot of the data subframe corresponding to a second type of service, and the first feedback bit and the second feedback bit are transmitted to the second equipment as HARQ feedback, so that the second equipment may provide differentiated data retransmission services for different types of service according to the feedback bits, thereby ensuring the timeliness of transmitting the data for ultra-reliable and low latency communication service.

It should be noted that, in the foregoing examples, the step taking the terminal as an executive subject may be separately implemented as the HARQ feedback method on the terminal side, and the step taking the access network device as the executive subject may be separately implemented as the HARQ feedback method on the access network device side. The detailed description thereof will be omitted here in the present disclosure.

The following is an example of an apparatus of the present disclosure, which may be used to implement examples of the method of the present disclosure. For details that are not disclosed in the examples of the apparatus of the present disclosure, reference is made to the example of the method of the present disclosure.

Figure 12:
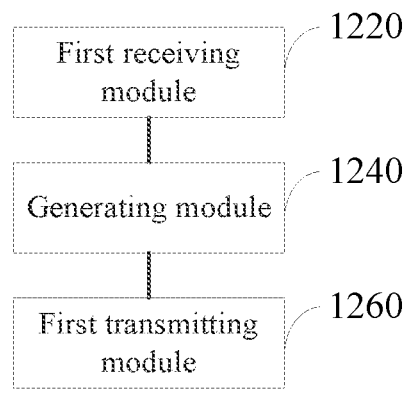
FIG. 12 is a schematic diagram showing a structure of a HARQ feedback apparatus according to some embodiments of the present disclosure.

Referring to FIG. 12, which shows a schematic diagram showing a structure of a HARQ feedback apparatus according to some embodiments of the present disclosure. The HARQ feedback apparatus may be implemented as a whole or a part of a first equipment in software, hardware and a combination. The HARQ feedback apparatus includes a first receiving module 1220, a generating module 1240 and a first transmitting module 1260.

The first receiving module 1220 is configured to implement the above steps 302, 404, 704, 904 and a function related to a receiving step.

The generating module 1240 is configured to implement the above step 303 and a function related to a generating step.

The first transmitting module 1260 is configured to implement the above steps 304, 408, 706, 710, 908 and a function related to a transmitting step.

In some embodiments, the apparatus further includes a first acquiring module;

The first acquiring module is configured to implement a function of the above step 402, 702 or 902.

Alternatively, the generating module 1240 includes a first detecting sub-module, a first allocating sub-module and a second allocating sub-module.

The first detecting sub-module is configured to implement a function of the above step 405.

The first allocating sub-module is configured to implement a function of the above step 406.

The second allocating sub-module is configured to implement a function of the above step 407.

Alternatively, the generating module 1240 includes a second allocating sub-module and a third allocating sub-module.

The third allocating sub-module is configured to implement a function of the above step 705.

The fourth allocating sub-module is configured to implement a function of the above step 709.

Alternatively, the generating module 1240 includes a second detecting sub-module, a fifth allocating sub-module and a sixth allocating sub-module.

The second detecting sub-module is configured to implement a function of the above step 905.

The fifth allocating sub-module is configured to implement a function of the above step 906.

The sixth allocating sub-module is configured to implement a function of the above step 907.

Figure 13:
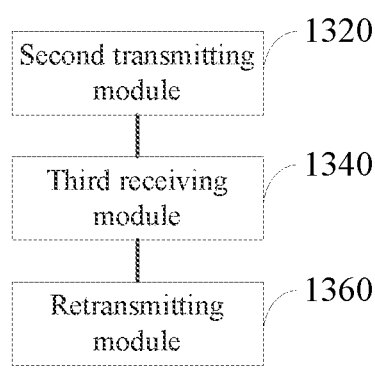
FIG. 13 is a schematic diagram showing a structure of a HARQ feedback apparatus according to some other embodiments of the present disclosure.

Referring to FIG. 13, which shows a schematic diagram showing a structure of a HARQ feedback apparatus according to some embodiments of the present disclosure. The HARQ feedback apparatus may be implemented as a whole or a part of a second equipment in software, hardware and a combination of the two. The HARQ feedback apparatus includes a second transmitting module 1320, a third receiving module 1340 and a retransmitting module 1360.

The second transmitting module 1320 is configured to implement the above steps 301, 403, 703, 903 and a function related to ac transmitting step.

The third receiving module 1340 is configured to implement the above steps 305, 409, 707, 711, 909 and a function related to a receiving step.

The retransmitting module 1360 is configured to implement the above steps 306, 708, 712, 910 and a function related to ac retransmitting step.

Alternatively, the apparatus further includes a second acquiring module.

The second acquiring module is configured to implement a function of the above step 410.

The retransmitting module 1360 includes an analysis sub-module and a retransmitting sub-module;

The analysis sub-module is configured to implement a function of the above step 411.

The retransmitting module is configured to implement a function of the above step 412.

Figure 14:
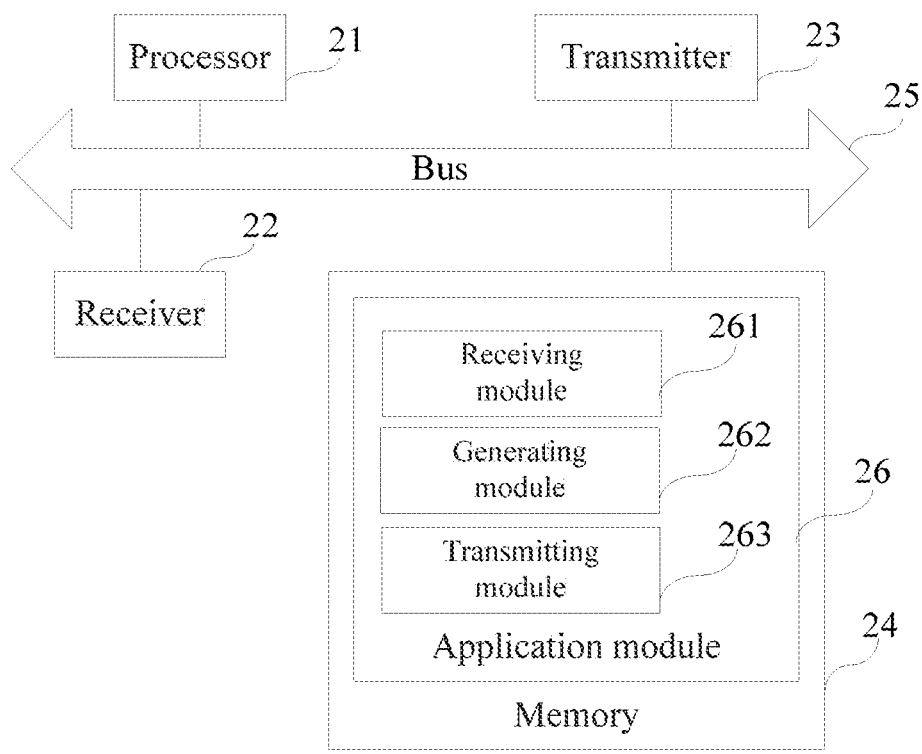
FIG. 14 is a schematic diagram showing a structure of a first equipment according to some embodiments of the present disclosure.

Referring to FIG. 14, which shows a schematic diagram showing a structure of a first equipment according to one exemplary example of the present disclosure. The first equipment includes a processor 21, a receiver 22, a transmitter 23, a memory 24, and a bus 25.

The processor 21 includes one or more processing cores. The processor 21 performs various function applications and information processing by running software programs and modules.

The receiver 22 and the transmitter 23 may be implemented as a communication component, which can be a communication chip. The communication chip may include a receiving module, a transmitting module and a modulating and demodulating module for modulating and/or demodulating information and receiving or transmitting the information through a wireless signal.

The memory 24 is connected with the processor 21 via a bus 25.

The memory 24 may be configured to store the software programs and the modules.

The memory 24 may store at least one application module 26 described by the function. The application module 26 may include a receiving module 261, a generating module 262, and a transmitting module 263.

The processor 21 is configured to execute the receiving module 261 to implement a function related to a step of receiving a data subframe and feedback policy information in the above-mentioned method examples. The processor 21 is configured to execute the generating module 262 to implement a function related to a step of generating the HARQ feedback in the above-mentioned method examples. The processor 21 is configured to execute the transmitting module 263 to realize a function related to a step of transmitting the HARQ feedback in the above-mentioned method examples.

In addition, the memory 24 may be implemented by any type of volatile or non-volatile storage devices or combinations thereof, such as a static anytime access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or a CD.

Figure 15:
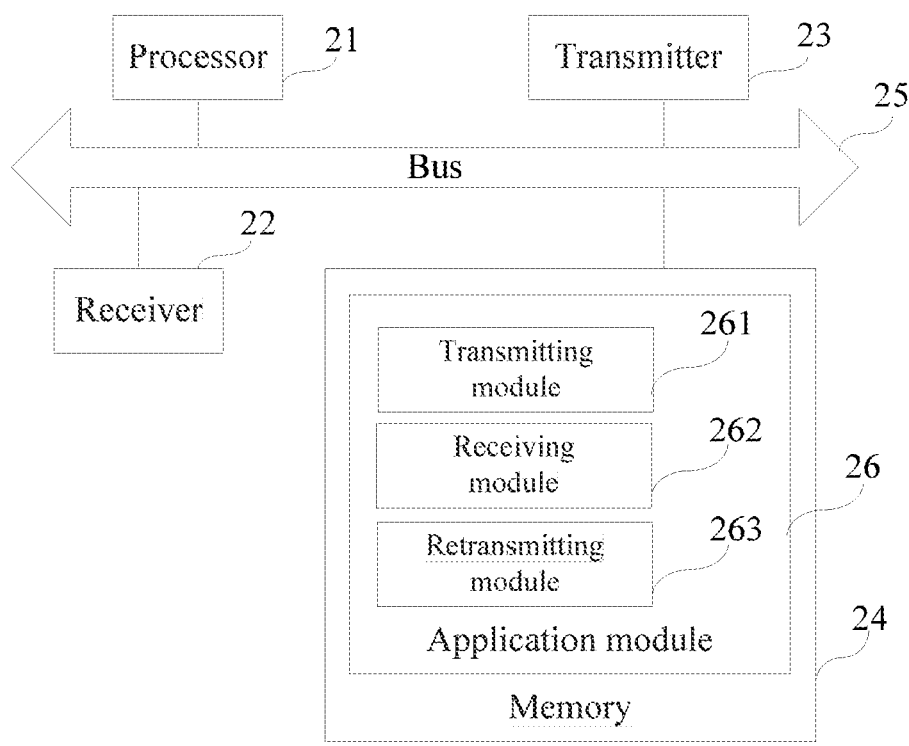
FIG. 15 is a schematic diagram showing a structure of a second equipment according to some embodiments of the present disclosure.

Referring to FIG. 15, which shows a schematic diagram showing a structure of a second equipment according to some embodiments of the present disclosure. The second equipment includes a processor 21, a receiver 22, a transmitter 23, a memory 24, and a bus 25.

The processor 21 includes one or more processing cores. The processor 21 performs various function applications and information processing by running software programs and modules.

The receiver 22 and the transmitter 23 may be implemented as a communication component, which can be a communication chip. The communication chip may include a receiving module, a transmitting module and a modulating and demodulating module for modulating and/or demodulating information and receiving or transmitting the information through a wireless signal.

The memory 24 is connected with the processor 21 through a bus 25.

The memory 24 may be configured to store the software programs and the modules.

The memory 24 may store at least one application module 26 described by the function. The application module 26 may include a transmitting module 261, a receiving module 262, and a retransmitting module 263.

The processor 21 is configured to execute the receiving module 261 to implement a function related to a step of receiving a data subframe and feedback policy information in the above-mentioned method examples. The processor 21 is configured to execute the generating module 262 to implement a function related to a step of generating the HARQ feedback in the above-mentioned method examples. The processor 21 is configured to execute the transmitting module 263 to implement a function related to a step of performing retransmission in the above-mentioned method examples.

In addition, the memory 24 may be implemented by any type of volatile or non-volatile storage devices or combinations thereof, such as a static anytime access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or a CD.

It should be appreciated by those skilled in the art that in one or more of the above examples, the functions described in the examples of the present disclosure may be implemented in hardware, software, firmware or any combination thereof. When being implemented in the software, these functions may be stored in a non-transitory computer-readable medium or transmitted as one or more instructions or codes on the computer-readable medium. The computer-readable medium includes a computer storage medium and a communication medium, wherein the communication medium includes any medium that facilitates the transmission of a computer program from one place to another. The storage medium may be any available medium accessible by a general computer or dedicated computer.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "connected," and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

Processors suitable for the execution of a computer program such as the instructions described above include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

The processor or processing circuit can be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, general processors, or other electronic components, so as to perform the above image capturing method.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A hybrid automatic repeat request (HARQ) feedback method, comprising:
receiving, by a first equipment, a data subframe transmitted by a second equipment, wherein the data subframe comprises a first slot corresponding to a first type of service and a second slot corresponding to a second type of service, and latency of the first type of service is lower than latency of the second type of service;

generating, by the first equipment, a HARQ feedback according to the data subframe, wherein the HARQ feedback includes a first feedback bit corresponding to the first slot and a second feedback bit corresponding to the second slot; and transmitting, by the first equipment, the HARQ feedback to the second equipment, wherein the generating, by the first equipment, the HARQ feedback according to the data subframe comprises one of:

generating, by the first equipment, the first feedback bit according to number of the first slot and number of feedback bits, and generating the second feedback bit by binding the second slot according to number of residual feedback bits; or generating, by the first equipment, the first feedback bit according to number of the first slot and number of additional bits, and generating the second feedback bit by binding the second slot according to number of feedback bits.

2. The method according to claim 1, further comprising: acquiring, by the first equipment, feedback policy information for generating the HARQ feedback.

3. The method according to claim 2, wherein the feedback policy information comprises number of feedback bits for the HARQ feedback; number of the first slots of the data subframe is a first number n, number of the feedback bits is m, and m is greater than or equal to 2;

wherein the generating a HARQ feedback according to the data subframe comprises:

detecting, by the first equipment, whether the first number is less than the number of feedback bits;

allocating, by the first equipment, the n first feedback bits to the n first slots when the first number is less than the number of feedback bits, wherein the n first feedback bits are configured to acknowledge the data received by the n first slots respectively; allocating, by the first equipment, m-n second feedback bits to the second slot, wherein the m-n second feedback bits are configured to acknowledge the data received by the second slots; and when the first number is greater than or equal to the number of feedback bits, allocating, by the first equipment, the m-1 first feedback bits to the n first slots, wherein the m-1 first feedback bits are configured to acknowledge the data received by the n first slots; allocating, by the first equipment, one of the second feedback bits to the second slot, wherein the second feedback bit is configured to acknowledge the data received by the second slot.

4. The method according to claim 3, wherein the feedback policy information comprises a binding policy for slots corresponding to the same type of service;

wherein the allocating the m−1 first feedback bits to the n first slots comprises:

allocating, by the first equipment, the m−2 first feedback bits to the m−2 first slots according to the binding policy and a time-domain sequence of the first slots; and binding the residual n−m+2 first slots, and allocating, by the first equipment, one first feedback bit to the residual n−m+2 first slots.

5. The method according to claim 2, wherein the feedback policy information comprises number of feedback bits of the HARQ feedback, wherein number of the first slots of the data subframe is a first number n, and the number of the feedback bits is 1 bit;

wherein the generating, by the first equipment, a HARQ feedback according to the data subframe comprises:

allocating, by the first equipment, the first feedback bit to the n first slots, wherein the first feedback bit is configured to acknowledge the data received by the n first slots; and when the first slot is not included in a next data subframe, allocating, by the first equipment, a second feedback bit to a second slot in a current data subframe and a second slot in the next data subframe.

6. The method according to claim 2, wherein the first feedback bit is an additional bit in the HARQ feedback, and the feedback policy information comprises number of the additional bits, and number of the first slots of the data subframe is a first number n, and the number of additional bits is k;

wherein the generating a HARQ feedback according to the data subframe comprises:

detecting, by the first equipment, whether the first number is greater than the number of additional bits;

when the first number is less than or equal to the number of additional bits, allocating, by the first equipment, n additional bits of the k additional bits to the n first slots, wherein the n additional bits are configured to acknowledge the data received by the n first slots respectively; and when the first number is greater than the number of additional bits, allocating, by the first equipment, the k additional bits to the n first slots, wherein the k additional bits are configured to acknowledge the data received by the n first slots.

7. The method according to claim 6, wherein the feedback policy information comprises a binding policy for slots corresponding to the same type of service;

wherein the allocating the k additional bits to the n first slots comprises:

allocating, by the first equipment, the k−1 additional bits to the first k−1 first slots according to the binding policy and a time-domain sequence of the first slots, wherein the k−1 additional bits are configured to acknowledge the data received by the k−1 first slots respectively; and binding the residual n−k+1 first slots, and allocating, by the first equipment, one additional bit to the residual n−k+1 first slots, wherein the additional bit is configured to acknowledge the data received by the residual n−k+1 first slots.

8. The method according to claim 2, wherein the feedback policy information is transmitted via a physical broadcast channel (PBCH), a radio resource control protocol (RRC) signaling or a physical downlink control channel (PDCCH).

9. The method according to claim 1, wherein the first type of service is an ultra-reliable low-latency communications (URLLC) service; and the second type of service is an enhanced mobile broadband (eMBB) service and/or a massive machine type communications (mMTC) service.

10. A hybrid automatic repeat request (HARQ) feedback method, comprising:

transmitting, by a second equipment, a data subframe to a first equipment, wherein the data subframe comprises a first slot corresponding to a first type of service and a second slot corresponding to a second type of service, and latency of the first type of service is lower than latency of the second type of service;

receiving, by the second equipment, a HARQ feedback transmitted by the first equipment, wherein the HARQ feedback includes a first feedback bit corresponding to the first slot and a second feedback bit corresponding to the second slot; and performing, by the second equipment, retransmission according to the HARQ feedback, wherein the first feedback bit is generated by the first equipment according to number of the first slot and number of feedback bits, and the second feedback bit is generated by binding the second slot according to number of residual feedback bits; or the first feedback bit is generated by the first equipment according to number of the first slot and number of additional bits, and the second feedback bit is generated by binding the second slot according to number of feedback bits.

11. The method according to claim 10, comprising:

acquiring, by the second equipment, feedback policy information for instructing rules for generating the HARQ feedback;

wherein the performing retransmission according to the HARQ feedback comprises:

analyzing, by the second equipment, the HARQ feedback according to the feedback policy information; and performing retransmission according to the analysis result.

12. The method according to claim 11, wherein the feedback policy information comprises:

number of feedback bits for the HARQ feedback; and/or a binding policy for slots corresponding to the same type of service.

13. The method according to claim 1, wherein the feedback policy information comprises:

number of additional bits, which is configured to indicate the number of additional bits in the HARQ feedback, wherein the additional bits are the first feedback bits; and/or a binding policy for slots corresponding to the same type of service.

14. The method according to claim 11, wherein the performing retransmission according to the analysis result comprises:

when the analysis result indicates that data in the first slot is not received correctly and data in the second slot is not received correctly, retransmitting, by the second equipment, the data in the first slot, and then retransmitting the data in the second slot.

15. The method according to claim 10, wherein the first type of service is an ultra-reliable low-latency communications (URLLC) service; and the second type of service is an enhanced mobile broadband (eMBB) service and/or a massive machine type communications (mMTC) service.

16. A mobile communication system implementing the method according to claim 10, the system comprising:

a processor;

a transceiver, which is connected with the processor;

memory, which is configured to store an instruction executable by the processor;

wherein the processor is configured to implement operations of the method.

17. The system according to claim 16, wherein the processor is further configured to:

acquire feedback policy information for generating the HARQ feedback;

wherein the performing retransmission according to the HARQ feedback comprises:

analyze the HARQ feedback according to the feedback policy information; and perform retransmission according to the analysis result;

wherein the performing retransmission according to the analysis result comprises:

when the analysis result indicates that data in the first slot is not received correctly and data in the second slot is not received correctly, retransmitting the data in the first slot, and then retransmitting the data in the second slot.

18. User equipment comprising:

a processor;

a transceiver coupled to the processor;

memory configured to store an instruction executable by the processor;

wherein the processor is configured to:

receive a data subframe transmitted by a second equipment, wherein the data subframe comprises a first slot corresponding to a first type of service and a second slot corresponding to a second type of service, and latency of the first type of service is lower than latency of the second type of service;

generate the HARQ feedback according to the data subframe, wherein the HARQ feedback comprises a first feedback bit corresponding to the first slot and a second feedback bit corresponding to the second slot; and transmit the HARQ feedback to the second equipment, wherein the generating the HARQ feedback according to the data subframe comprises one of:

generating the first feedback bit according to number of the first slot and number of feedback bits, and generating the second feedback bit by binding the second slot according to number of residual feedback bits; or generating the first feedback bit according to number of the first slot and number of additional bits, and generating the second feedback bit by binding the second slot according to number of feedback bits.

19. The user equipment of claim 18, wherein the processor is further configured to:

acquire feedback policy information for generating the HARQ feedback, wherein the feedback policy information comprises number of feedback bits for the HARQ feedback; number of the first slots of the data subframe is a first number n, number of the feedback bits is m, and m is greater than or equal to 2;

wherein generating a HARQ feedback according to the data subframe comprises:

detecting whether the first number is less than the number of feedback bits;

allocating the n first feedback bits to the n first slots when the first number is less than the number of feedback bits, wherein the n first feedback bits are configured to acknowledge the data received by the n first slots respectively; allocating m−n second feedback bits to the second slot, wherein the m−n second feedback bits are configured to acknowledge the data received by the second slots; and when the first number is greater than or equal to the number of feedback bits, allocating the m−1 first feedback bits to the n first slots, wherein the m−1 first feedback bits are configured to acknowledge the data received by the n first slots; allocating one of the second feedback bits to the second slot, wherein the second feedback bit is configured to acknowledge the data received by the second slot.

20. The user equipment of claim 19, wherein the feedback policy information comprises a binding policy for slots corresponding to the same type of service;
    wherein the allocating the m−1 first feedback bits to the n first slots comprises:
    allocate the m−2 first feedback bits to the m−2 first slots according to the binding policy and a time-domain sequence of the first slots; and
    bind the residual n−m+2 first slots, and allocating one first feedback bit to the residual n−m+2 first slots.

* * * * *